United States Patent
Kwan et al.

(10) Patent No.: US 9,635,495 B2
(45) Date of Patent: Apr. 25, 2017

(54) SUPPORTING VIRTUALLY SIMULTANEOUS OPERATION OF DUAL WIRELESS PROTOCOLS IN A SINGLE DEVICE

(71) Applicant: SilverPlus, Inc., Irvine, CA (US)

(72) Inventors: Dennis Kwan, San Diego, CA (US); Jefferson Hu, Corona, CA (US); Jeffrey Hsieh, Dove Canyon, CA (US)

(73) Assignee: Silverplus, Inc., Irvine, CA (US)

( * ) Notice: Subject to any disclaimer, the term of this patent is extended or adjusted under 35 U.S.C. 154(b) by 0 days.

(21) Appl. No.: 14/559,302

(22) Filed: Dec. 3, 2014

(65) Prior Publication Data

US 2016/0165380 A1    Jun. 9, 2016

(51) Int. Cl.
*H04W 4/00* (2009.01)
*H04W 52/02* (2009.01)

(52) U.S. Cl.
CPC ....... *H04W 4/008* (2013.01); *H04W 52/0251* (2013.01)

(58) Field of Classification Search
CPC .. G06F 1/163; H04M 2250/02; H04M 1/0279
See application file for complete search history.

(56) References Cited

U.S. PATENT DOCUMENTS

| | | |
|---|---|---|
| 8,725,842 B1 | 5/2014 | Al-Nasser |
| 8,854,925 B1 | 10/2014 | Lee et al. |
| 2003/0054818 A1 | 3/2003 | Bahl et al. |
| 2011/0021143 A1* | 1/2011 | Kapur et al. ............... 455/41.2 |
| 2011/0237191 A1 | 9/2011 | Saito et al. |
| 2012/0302170 A1 | 11/2012 | Frazier et al. |
| 2013/0109315 A1 | 5/2013 | Polo et al. |
| 2013/0109323 A1 | 5/2013 | Ruutu et al. |
| 2013/0273851 A1 | 10/2013 | Preiszler et al. |
| 2014/0039804 A1* | 2/2014 | Park et al. ..................... 702/19 |
| 2014/0045480 A1 | 2/2014 | Hsieh et al. |
| 2014/0045547 A1* | 2/2014 | Singamsetty et al. ..... 455/552.1 |
| 2014/0161274 A1 | 6/2014 | Singamsetty et al. |
| 2014/0171156 A1* | 6/2014 | Pattikonda et al. ....... 455/569.1 |
| 2014/0280578 A1* | 9/2014 | Barat et al. .................. 709/204 |
| 2014/0298353 A1* | 10/2014 | Hsu et al. .................... 719/313 |
| 2014/0334271 A1* | 11/2014 | Park et al. ..................... 368/10 |
| 2015/0049591 A1* | 2/2015 | Adams et al. ................ 368/13 |
| 2015/0098309 A1* | 4/2015 | Adams et al. ................ 368/10 |
| 2015/0253885 A1* | 9/2015 | Kagan et al. .......... G06F 3/041 |

OTHER PUBLICATIONS

PCT Search Report PCT/US2015/063828, Dec. 3, 2015.

* cited by examiner

*Primary Examiner* — David Bilodeau
(74) *Attorney, Agent, or Firm* — Saile Ackerman LLC; Stephen B. Ackerman

(57) ABSTRACT

Appearance of simultaneous connections is provided to devices that support two wireless protocols which are not permitted to operation simultaneously. As an example the method and systems disclosed are applied to the communication between a phone and a smartwatch wherein Bluetooth (BT) classic protocol is used for e.g. voice commands and phone calls and Bluetooth low Energy (BLE) protocol is used for data notifications. In a first embodiment of the disclosure automatic mode switching between BT and BLE is provided. In a second embodiment a dual-ID device utilizes separate IDs for both protocols in time multiplexed connections. It operates as logically independent devices with individual ID's although physically it is a single device.

9 Claims, 5 Drawing Sheets

SUPPORTING VIRTUALLY SIMULTANEOUS OPERATION OF DUAL WIRELESS PROTOCOLS IN A SINGLE DEVICE

BACKGROUND

Technical Field

This disclosure relates generally to wireless communications and relates in particular to devices supporting two wireless protocols which are not permitted to operation simultaneously, either by protocol definition or by functional limitation of hardware.

Background

There are devices that support two wireless protocols which, by their own definitions, are not permitted to operate simultaneously, either by protocol definition or by functional limitation of hardware. A very common and important example of such a configuration is where a phone may be connected wirelessly to a smartwatch, as shown in FIG. 1 prior art below, over two Bluetooth protocols:
1. Bluetooth Basic Rate/Extended Data Rate (BR/EDR) Controller—hereby referred to as Bluetooth Classic (BT) and
2. Bluetooth Low Energy (BLE) Controller In the scenario shown in FIG. 1 prior art, both devices support the two protocols, but may only be connected using one of the two, at any given time, as is apparent in FIG. 2 prior art which shows the status of the phone in such a situation. The smartwatch in this case connects either as a BT device called e.g. Martian Watch, or as a BLE device called e.g. Martian Smart, as is shown connected in FIG. 2 prior art. It has to be understood that the application shown in FIG. 2 prior art is only an example of communication problems with devices supporting two wireless protocols which are not permitted to operate simultaneously, either by protocol definition or by functional limitation of hardware.

BT is used for voice applications, such as voice commands and phone calls, and BLE is used by many phones for data notifications generated by apps such as emails, messages, and news. Both protocols are essential for a smartwatch that supports voice as well as notification functions, even though they cannot be in connected states simultaneously. To require manual settings by the users to switch mode every time would be extremely inconvenient.

It is a challenge to designers of communication devices to achieve methods by which a device such as e.g. the smartwatch can provide the appearance of simultaneous connections to the user, in that there is seamless transitions between the modes of operations between the two protocols and that all functions are made available to the user without explicit mode-switching by the user.

SUMMARY

A principal object of the present disclosure is to provide appearance of simultaneous connections to devices that support two wireless protocols which are not permitted to operate simultaneously, either by protocol definition or by functional limitation of hardware.

A further object of the present disclosure is to provide seamless transitions between modes of operations between the two protocols and that all functions are made available to the user without explicit mode-switching by the user.

A further object of the present disclosure is to enable seamless switching between BT and BLE modes with no user intervention, and minimizing perceived time latency for switching by carrying out other operations during the time of switching.

A further object of the present disclosure is to achieve a Dual-ID BT and BLE device to support truly simultaneous voice and data connections between device and Bluetooth master.

A further object of the present disclosure is to achieve an efficient implementation of the Dual-ID device with reduced increase in complexity compared to typical dual-mode Bluetooth device.

In accordance to the objects of the disclosure a method to provide appearance of simultaneous connections between two devices each supporting two different wireless communication protocols which are not permitted to operate simultaneously has been achieved. The method disclosed comprises, firstly, the steps of: (1) connecting both devices using a first wireless communication protocol, (2) receiving by a first of both devices an external wireless event or a user action-triggered mode switch, and (3) sending, in case of an external wireless event, a notification of said external wireless event to a user of the first device and go to step (4), else, in case of a user action-triggered mode switch go to step (4). Furthermore the method comprises the steps of: (4) disconnecting the first device from using the first wireless protocol, (5) connecting the first device to the second device using the second wireless protocol, (6) checking, in case of the external wireless event, for a correspondent user action and, if it so, executing correspondent user action and go to step (9), else, after waiting for a defined time span without correspondent user action, go to step (9), and (7) sending, in case of a user action-triggered mode switch, messages from the first device to the second device using the second wireless protocol according to the user action. Moreover the method comprises the steps of: (8) sending messages from the second device to the first device using the second wireless protocol according to the user action, (9) checking, if a new user action or a new external wireless event have occurred, and, if it so, go to step (3) else go to step (10), (10) disconnecting both devices from using the second wireless protocol, and (11) connecting both devices using the first wireless communication protocol.

In accordance to the objects of the disclosure a system to provide appearance of simultaneous connections between two devices each supporting two different wireless communication protocols which are not permitted to operate simultaneously has been achieved. The system disclosed comprises: a first of the two devices utilizing dual separate communication protocol addresses for the two wireless communication protocols in time-multiplexed connection with a second of both devices, wherein the first device is configured to support both wireless protocols as a dual mode device, wherein the first device is configured to operate as two logical independent devices with independent addresses although it is a single physical device, and the second of the two devices configured as dual wireless protocol master.

BRIEF DESCRIPTION OF THE DRAWINGS

In the accompanying drawings forming a material part of this description, there is shown.

DESCRIPTION

The preferred embodiments of the present disclosure present methods and systems to provide appearance of simultaneous connections to devices that support two wireless communication protocols which are not permitted to operate simultaneously. The simultaneous operation is not permitted either by protocol definition, as in the case of BT and BLE, wherein the two devices are not permitted to operate simultaneously under some states for each device, or are not permitted due to functional limitation of the hardware for each device.

The methods are explained using, as a non-limiting example, a smartwatch supporting Bluetooth Classic (BT) and Bluetooth Low Energy (BLE) communication protocols. Both protocols are not permitted to simultaneous operation due to protocol definition.

It has to be understood that the methods and systems disclosed are applicable to any devices supporting any two wireless communication protocols, which are not permitted to operate simultaneously either by protocol definition, as in the case of BT and BLE, that the two devices are not permitted to operate simultaneously under some states for each device, or are not permitted due to functional limitation of the hardware for each device 1. Automatic Mode-Switching:

The device, e.g. a smartwatch stays in BLE mode normally for low power operations, and switches mode automatically upon a user action or external event to perform operations supported only in BT mode, and upon completion of those functions, switches back automatically to BLE mode.

Figure 1:
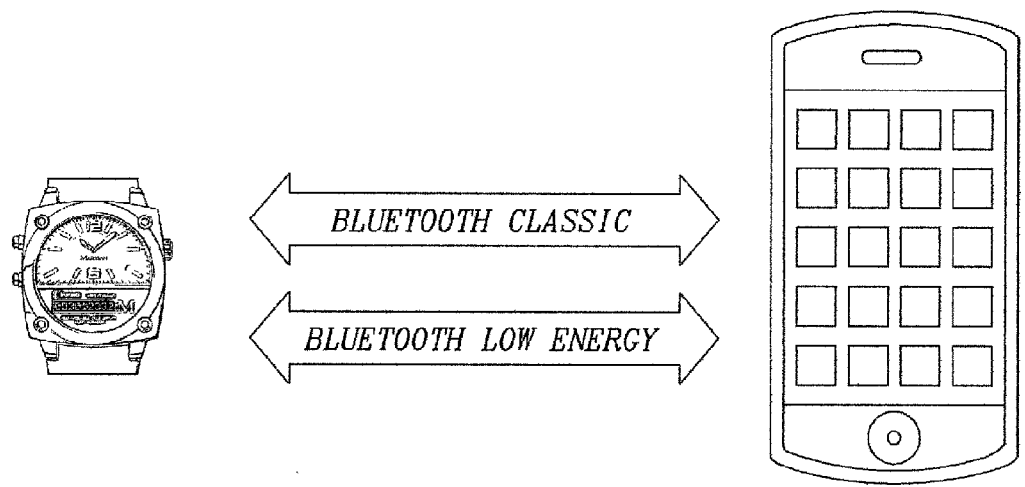
FIG. 1 prior art shows an example of two devices connected wirelessly over two different Bluetooth protocols.
Figure 2:
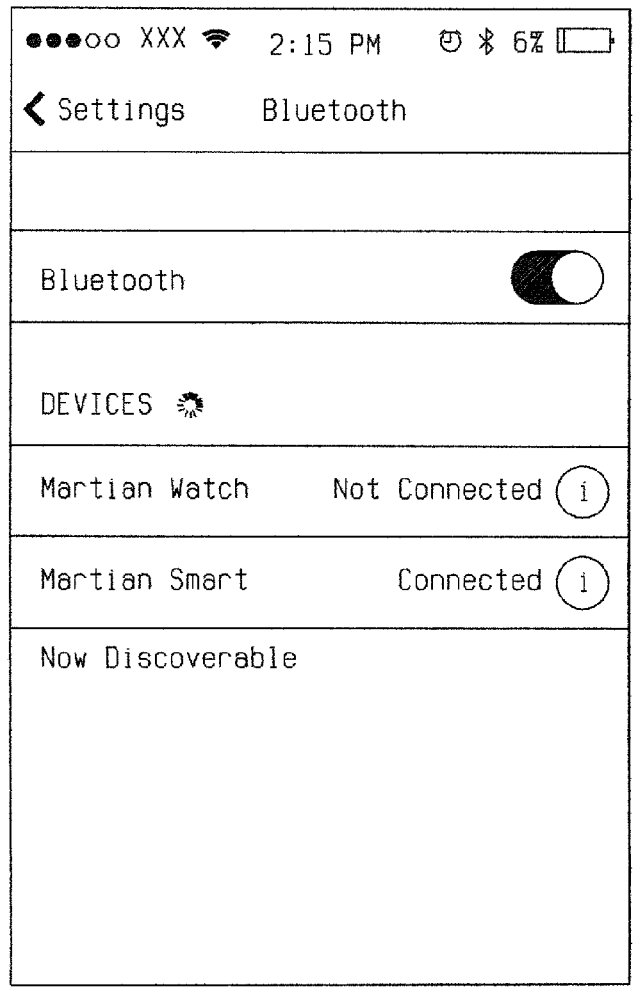
FIG. 2 prior art shows an example of a phone supporting two protocols but being enabled to use only one protocol at any given time.
Figure 3:
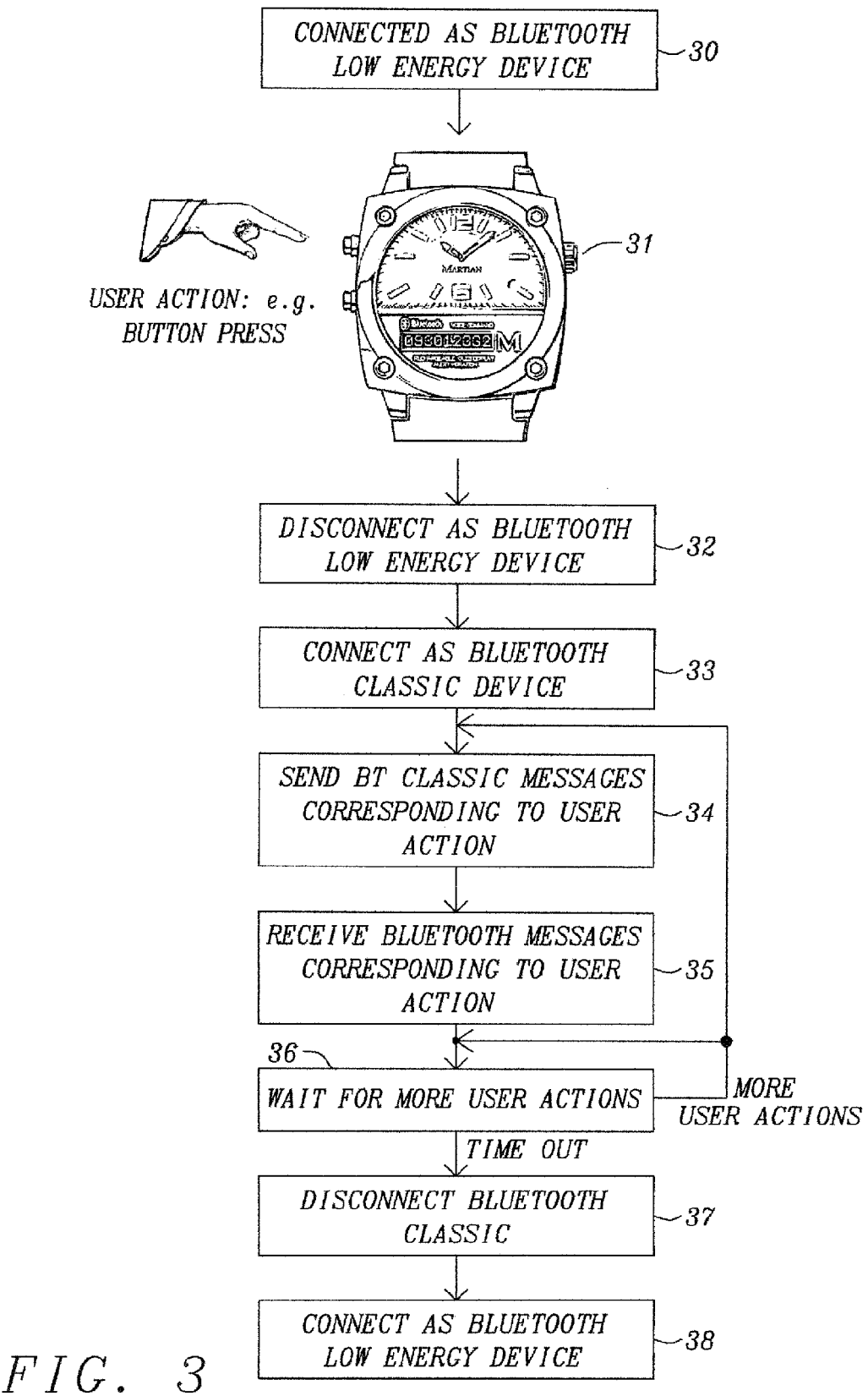
FIG. 3 shows the flow chart of a first embodiment of the Automatic Mode-Switching method, namely user action-triggered mode switching.

FIG. 3 shows the flow chart of a first embodiment of the Automatic Mode-Switching method, namely user action-triggered mode switching user action-triggered mode switching, for example due to a button press to activate voice-command functions. The smartwatch automatically disconnects from a phone as a BLE device and reconnects back to the phone immediately as a BT device, sends the messages corresponding to the user actions, and upon completion of which, disconnects as a BT device from the phone and reconnects back to the phone as a BLE device.

Step 30 of the method illustrated by FIG. 3 shows connecting the smartwatch to a phone using the Bluetooth BLE protocol. Steps 31/32/33 depict disconnecting the smartwatch from the BLE connection by a user action as e.g. pressing a button and connecting the smartwatch to the phone using the classic BT protocol.

It should be noted that at the press of the button, the BLE transceiver inside the Watch initiates the termination of the BLE connection between the Watch and the Phone by sending the required messages and follow the BLE protocol for connection termination. Upon completion of the termination process, the BT transceiver inside the Watch (which can be physically the same component as the BLE transceiver) initiates a BT connection to the phone by sending the required messages and following the BT protocol for connection setup. The action is complete when the BT connection is set up and the Watch communicates to the Phone via the BT protocol.

It should be also noted that steps 32 and 33 are performed upon the user action of step 31 and no additional user action is required for connecting the device to the phone via the classic BT protocol. Step 34 describes sending classic BT messages from the smartwatch to the phone corresponding to a user action. Step 35 illustrates receiving Bluetooth messages from the phone to the smartwatch corresponding to user action. Step 36 describes a waiting loop waiting for more actions. In case more user actions are to be performed the process flow goes back to step 34 in order to execute the desired action in steps 34 and 35.

After a Time-Out, i.e. a time span without a user action, the device automatically falls back to a BLE connection mode in order to save power.

Figure 4:
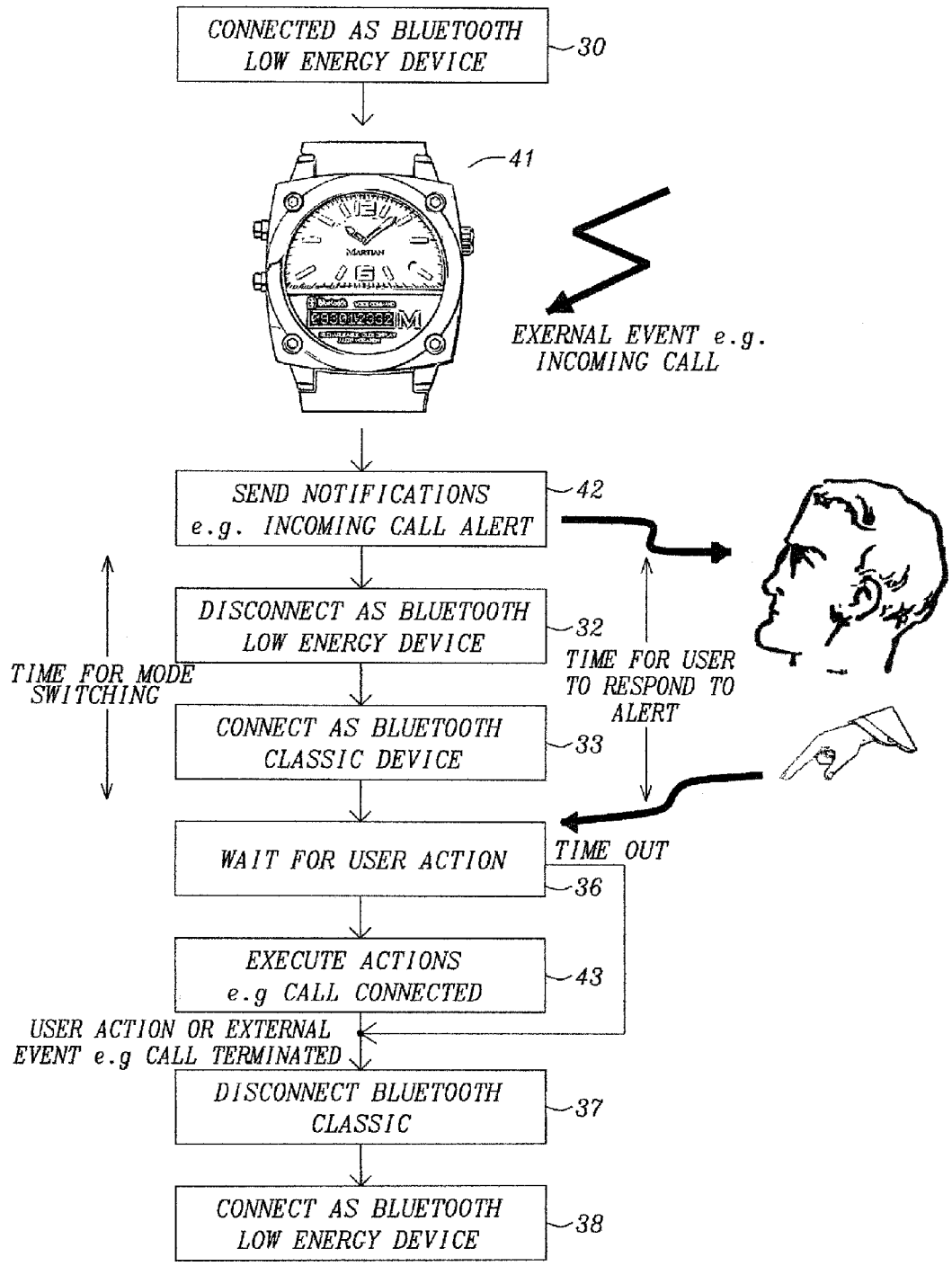
FIG. 4 shows a flow chart of a second embodiment of the Automatic Mode-Switching method, namely an external event-triggered mode switching method.

FIG. 4 shows a flow chart of a second embodiment of the Automatic Mode-Switching method, namely an external event-triggered mode switching method such as by e.g. an incoming call. In this case the smartwatch may alert the user as e.g. in case of an incoming call, and immediately switches automatically from BLE to BT mode without waiting for any user response such as pushing a button to answer to call. The call can then be connected until the mode switch is complete and user has taken action to accept the call. The perceived delay due to mode-switching is minimized as the time for mode-switching overlaps the time for user response, as shown in FIG. 4. Finally at the completion of the operations such as the termination of a call by the user, the smartwatch switches back automatically into BLE mode.

Identical steps of the flowcharts of FIGS. 3 and 4 are signified by the same step numbers.

The first step 30 of the flowchart of FIG. 4, namely connecting the smartwatch using the Bluetooth BLE protocol, is identical to the first step of the method of FIG. 3. In following steps 41/42 an external event, as e.g. an incoming call, happens and the smartwatch sends a corresponding notification to the user. The following steps 32/33 signify the time required for mode switching and depict disconnecting the smartwatch from the BLE connection activated by the external event of step 41 and connecting the smartwatch using the classic BT protocol. The next step 36 illustrates waiting for a user action corresponding to the external event until a time-out is activated if no action is taken. In case no action is taken the process flow goes to step 37 where the smartwatch is disconnected from the classic BT protocol and in the following step 38 the smart watch is connected as a BLE device. In case the user takes action in response to the alert sent in step 42 the correspondent action is taken in step 43 and the process flow is proceeds to step 37.

Steps 42, 32, 33 and 36 including the time out span of step 36 define the time available to the user to respond to the alert.

It should be noted that the flowcharts of FIGS. 3 and 4 describe two operations of the smartwatch, namely user action-triggered mode switch (FIG. 3) and external wireless triggered mode switch (FIG. 4). It is obvious that the smartwatch is configured to support both switching modes and that therefore the both flowcharts can be combined since in reality both switching modes can happen any time.

2. Dual-ID (Communication Protocol Addresses) Device Utilizing Separate Addresses (IDs)

The Dual-ID device utilizes separate IDs (i.e. Bluetooth addresses) for the two different modes in time-multiplexed connections: in case of using Bluetooth, the device (smartwatch) contains both BT and BLE as a dual mode device, but furthermore it operates as logically two independent devices with individual ID's being Bluetooth Addresses (BD_ADDR) although physically it is a single device. In this case the phone, being a dual-mode BT and BLE master, may connect to the smartwatch simultaneously in BT and BLE modes as logically two independent devices.

Figure 5:
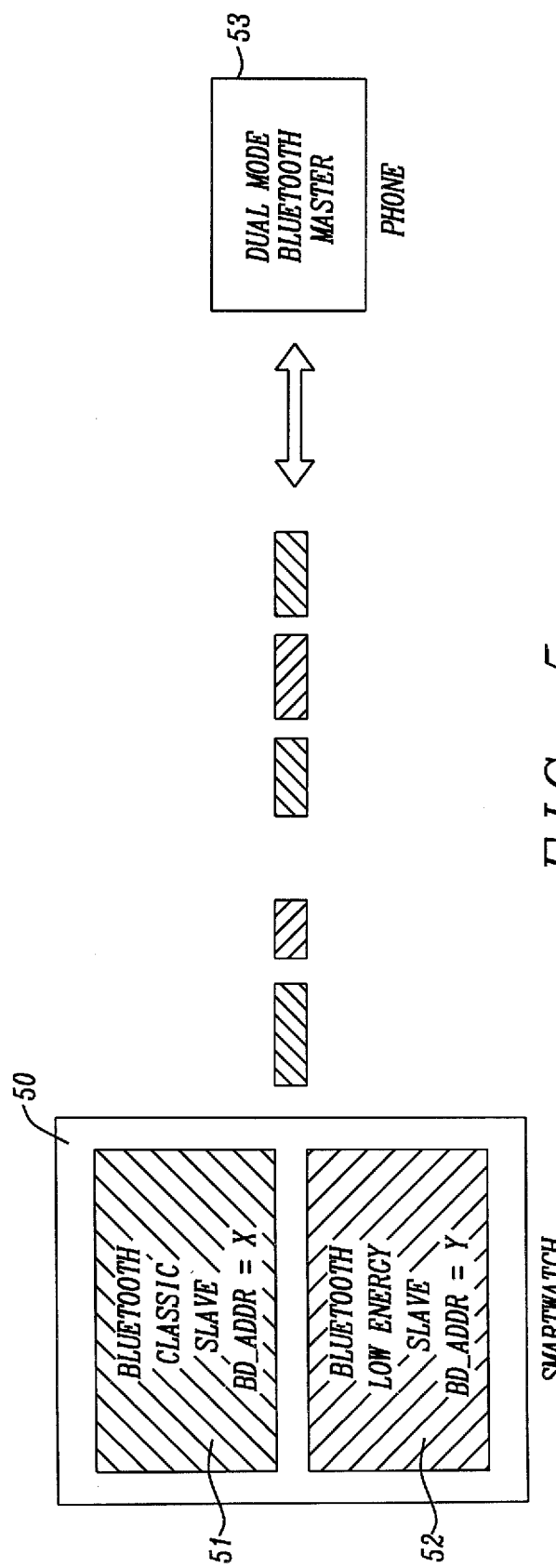
FIG. 5 shows a block diagram of a smartwatch with BT and BLE functions that have independent BD_ADDR addresses and connect to the phone as two separate slave devices.

FIG. 5 shows a block diagram of a smartwatch 50 with BT and BLE functions that have independent BD_ADDR and connect to the phone as two separate slave 51/52 devices, wherein the BT classic slave 51 is hatched to the right side and the BLE slave 52 is hatched to the left side. As the phone 53 is a dual-mode Bluetooth master in this case, communication to the two slaves is naturally time-multiplexed as controlled by the master. The communication data blocks according to BT classic protocol are also hatched to the right and the communication data blocks according to BLE protocol are also hatched to the left, This means that the two slaves may share a lot of the hardware even though it is not the typical dual-mode controller that supports simultaneous BT and BLE as a master. This special case of dual-ID device that can connect as two separate slaves to the same master, in BT and BLE modes, lends itself to efficient hardware implementation as another major feature of this invention.

Figure 6:
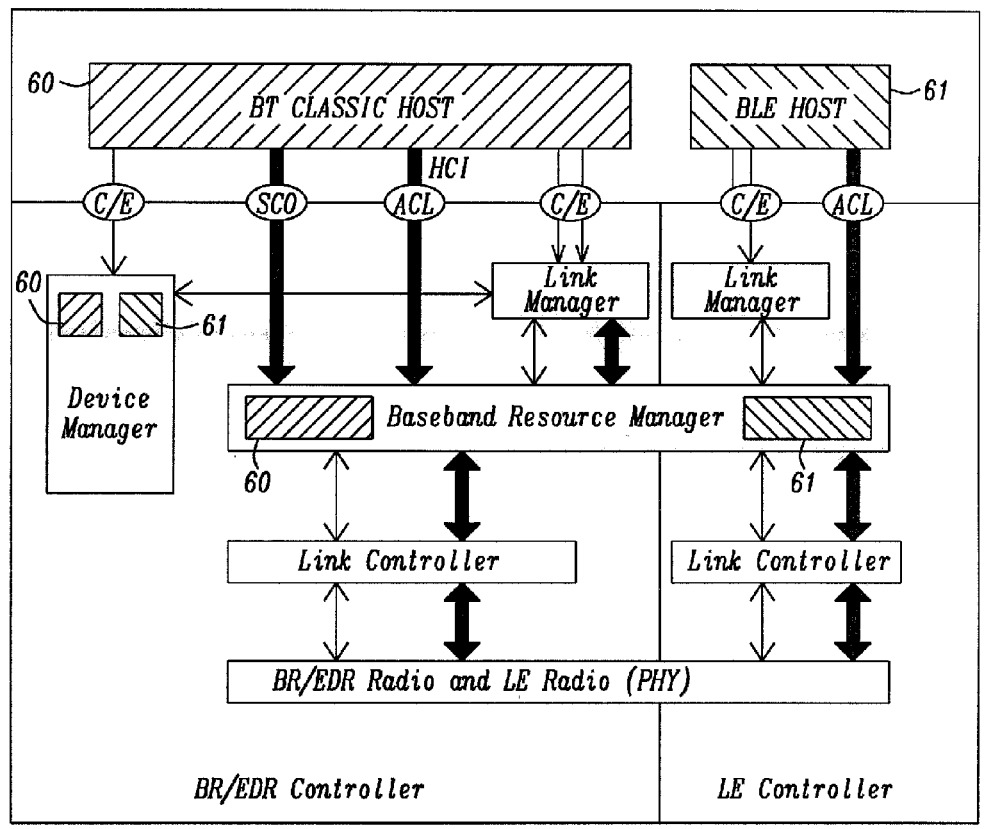
FIG. 6 shows the aspect of efficient hardware implementation disclosed within the Bluetooth core system architecture.

FIG. 6 shows the aspect of efficient hardware implementation disclosed within the Bluetooth core system architecture [Bluetooth Specification Version 4.0, Vol. 1, pp. 31]. Compared to the typical dual-mode controller that can share all the controller blocks between BT and BLE, this dual-ID device would contain individual instantiations of all blocks related to the specific BD_ADDR, as shown by FIG. 6 wherein the blocks related to BT classic ADDR are signified by the label 60 and the blocks related to BLE ADDR are signified by the label 61.

Key advantages of the Dual-ID device disclosed utilizing separate Ids for two different modes are:
1. Seamless switching between BT and BLE modes with no user intervention, and minimizing perceived time latency for switching by carrying out other operations, such as alerting the user and waiting for user input, during the time of switching.
2. Dual-ID (Bluetooth addresses) BT and BLE device to support truly simultaneous voice and data connections between device and Bluetooth master.
3. Efficient implementation of the Dual-ID device with only small increase in complexity compare to typical dual-mode Bluetooth device.

It has to be noted that the methods and systems applying BT classic and BLE protocols shown above are non-limiting examples only. The systems and methods can be applied to any other dual protocol applications.

While the disclosure has been particularly shown and described with reference to the preferred embodiments thereof, it will be understood by those skilled in the art that various changes in form and details may be made without departing from the spirit and scope of the disclosure.

What is claimed is:

1. A method to provide appearance of simultaneous connections between two devices each supporting two different wireless communication protocols which are not permitted to operate simultaneously, the method comprising the steps of:
   (1) connecting both devices using a first wireless communication protocol;
   (2) receiving by a first of both devices an external wireless event or a user action-triggered mode switch;
   (3) sending, in case of an external wireless event, a notification of said external wireless event to a user of the first device and go to step (4), else, in case of a user action-triggered mode switch go to step (4);
   (4) disconnecting the first device from using the first wireless protocol;
   (5) connecting the first device to the second device using the second wireless protocol;
   (6) checking, in case of the external wireless event, for a correspondent user action and, if it so, executing correspondent user action and go to step (9), else, after waiting for a defined time span without correspondent user action, go to step (9);
   (7) sending, in case of a user action-triggered mode switch, messages from the first device to the second device using the second wireless protocol according to the user action;
   (8) sending messages from the second device to the first device using the second wireless protocol according to the user action;
   (9) checking, if a new user action or a new external wireless event have occurred, and, if it so, go to step (3) else go to step (10);
   (10) disconnecting both devices from using the second wireless protocol; and
   (11) connecting both devices using the first wireless communication protocol.

2. The method of claim 1, wherein the first device is a smartwatch and the second device is a phone.

3. The method of claim 1, wherein the first wireless protocol is Bluetooth Low Energy (BLE) communication protocol and the second wireless protocol is Bluetooth Classic (BT) protocol.

4. The method of claim 3, wherein BLE communication protocol is used for relative low power consuming operations.

5. The method of claim 4, wherein the relative low power operations comprise data notifications generated by apps comprising emails, messages and news.

6. The method of claim 3, wherein the BT protocol is used for voice applications.

7. The method of claim 6, wherein the voice applications comprise voice commands and phone calls.

8. The method of claim 1, wherein the user action-triggered mode switch is activated by pressing a button of the first device.

9. The method of claim 1, wherein the external wireless event is an incoming phone call.

* * * * *